(12) United States Patent
Sokhandan Asl

(10) Patent No.: US 11,605,230 B2
(45) Date of Patent: Mar. 14, 2023

(54) SYSTEMS AND METHODS FOR COMPLIANCE MONITORING

(71) Applicant: ELEMENT AI INC., Montreal (CA)

(72) Inventor: Negin Sokhandan Asl, Montreal (CA)

(73) Assignee: SERVICENOW CANADA INC., Montreal (CA)

(*) Notice: Subject to any disclaimer, the term of this patent is extended or adjusted under 35 U.S.C. 154(b) by 129 days.

(21) Appl. No.: 17/064,361

(22) Filed: Oct. 6, 2020

(65) Prior Publication Data

US 2021/0240996 A1 Aug. 5, 2021

Related U.S. Application Data

(60) Provisional application No. 62/968,918, filed on Jan. 31, 2020.

(51) Int. Cl.
*G06K 9/00* (2022.01)
*G06V 20/52* (2022.01)
*G06K 9/62* (2022.01)
*G06Q 10/087* (2023.01)
*G06N 3/04* (2023.01)
(Continued)

(52) U.S. Cl.
CPC ............. *G06V 20/52* (2022.01); *G06K 9/627* (2013.01); *G06K 9/628* (2013.01); *G06K 9/6232* (2013.01); *G06K 9/6262* (2013.01); *G06N 3/04* (2013.01); *G06N 3/08* (2013.01); *G06Q 10/087* (2013.01); *G06Q 30/0185* (2013.01)

(58) Field of Classification Search
CPC .... G06V 20/52; G06V 10/454; G06K 9/6232; G06K 9/6262; G06K 9/627; G06K 9/628; G06N 3/04; G06N 3/08; G06N 3/0454; G06Q 10/087; G06Q 30/0185
See application file for complete search history.

(56) References Cited

U.S. PATENT DOCUMENTS 8,189,855 B2 * 5/2012 Opalach ............... G06Q 10/087
382/209
10,007,964 B1 6/2018 Calhoon et al.
(Continued)

OTHER PUBLICATIONS

Li et al., "Csrnet: Dilated convolutional neural networks for understanding the highly congested scenes", In Proceedings of the IEEE conference on computer vision and pattern recognition, 2018, pp. 1091-1100.
(Continued)

*Primary Examiner* — Dhaval V Patel
(74) *Attorney, Agent, or Firm* — BCF LLP

(57) ABSTRACT

Systems and methods for monitoring product placement. The method comprises accessing a first image depicting a plurality of items arranged in accordance with a first layout, accessing a second image, the second image depicting at least some of the plurality of items arranged in accordance with a second layout. The method then proceeds to inputting, to a machine learning algorithm (MLA), a first density map and a second density map, the first density map having been generated from the first image and the second density map having been generated from the second image. An anomaly map is then outputted by the ML, the anomaly map comprising a first indication of an item class associated with an anomaly and a second indication of a position associated with the anomaly.

20 Claims, 10 Drawing Sheets

(51) Int. Cl.
  *G06N 3/08* (2023.01)
  *G06Q 30/018* (2023.01)

(56) References Cited

U.S. PATENT DOCUMENTS

| | | | |
|---|---|---|---|
| 10,445,694 | B2 | 10/2019 | Fisher et al. |
| 10,496,955 | B2* | 12/2019 | Bryan ............... H04W 4/35 |
| 2015/0262116 | A1 | 9/2015 | Katircioglu et al. |
| 2017/0178060 | A1 | 6/2017 | Schwartz |
| 2019/0034864 | A1 | 1/2019 | Skaff et al. |
| 2019/0147584 | A1* | 5/2019 | Onoro-Rubio ....... G06N 3/0481 382/100 |
| 2019/0236530 | A1 | 8/2019 | Cantrell et al. |
| 2019/0236531 | A1 | 8/2019 | Adato et al. |
| 2019/0378205 | A1 | 12/2019 | Glaser et al. |
| 2020/0387718 | A1* | 12/2020 | Chan .................. H04N 13/282 |
| 2021/0012272 | A1* | 1/2021 | Dugar ............... G06Q 30/0185 |
| 2021/0158094 | A1* | 5/2021 | Ji .......................... G06N 3/0454 |

OTHER PUBLICATIONS

Ronneberger et al., "U-net: Convolutional networks for biomedical image segmentation", In International Conference on Medical image computing and computer-assisted intervention, 2015, pp. 234-241.

Weidi et al., "Microscopy cell counting with fully convolutional regression networks", In 1st Deep Learning Workshop, Medical Image Computing and Computer-Assisted Intervention (MICCAI), 2015.

Serra et al., "A deep learning pipeline for product recognition on store shelves", IEEE International Conference on Image Processing, Applications and Systems (IPAS), 2018, pp. 25-31, https://arxiv.org/pdf/1810.01733.pdf.

Tonioni et al., "Product recognition in store shelves as a sub-graph isomorphism problem", International Conference on Image Analysis and Processing, pp. 682-693, https://arxiv.org/pdf/1707.08378.pdf.

Frontoni et al., "Embedded vision sensor network for planogram maintenance in retail environments", Sensors 15, 2015, pp. 21114-21133, https://www.mdpi.com/1424-8220/15/9/21114/pdf.

Santra et al., "A comprehensive survey on computer vision based approaches for automatic identification of products in retail store", Image and Vision Computing 86, 2019, 23 pages, http://www.bikashsantra.byethost7.com/pdfs/Product%20Detection%20Survey%20Paper%20IVC%20PP.pdf?i=1.

Higa et al., "Robust Shelf Monitoring Using Supervised Learning for Improving On-Shelf Availability in Retail Stores", Sensors 19,19: 2722, 20 pages, https://www.mdpi.com/1424-8220/19/12/2722/pdf.

Varadarajan et al., "Weakly Supervised Object Localization on grocery shelves using simple FCN and Synthetic Dataset", arXiv preprint arXiv: 1803.06813, 7 pages, https://arxiv.org/pdf/1803.06813.pdf.

Chong et al., "Deep Learning Approach to Planogram Compliance in Retail Stores", Stanford University, CA, 6 pages, http://cs229.stanford.edu/proj2016/report/ChongWeeBustan-DeepLearningApproachToPlanogramComplianceInRetailStores-report.pdf.

* cited by examiner

410
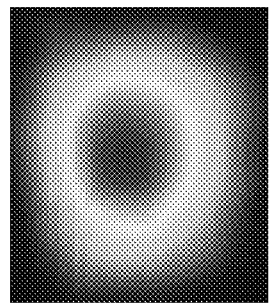
412
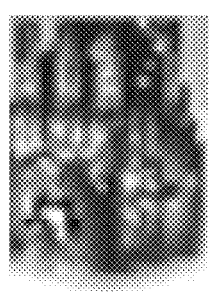
420
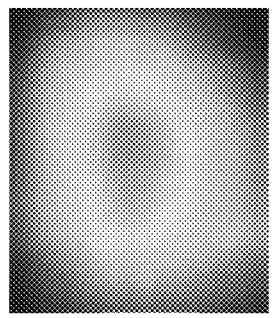
422
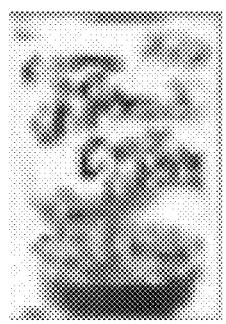
430
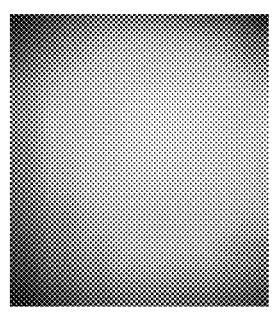
424
FIG. 4

900

| Access a first image, the first image depicting a plurality of items arranged in accordance with a first layout, the plurality of items being categorised in accordance with a plurality of item classes, the first layout defining a reference state of placement of the items | — 902 |

↓

| Access a second image, the second image depicting at least some of the plurality of items arranged in accordance with a second layout, the second layout defining a different state of placement of the items | — 904 |

↓

| Input, to a machine learning algorithm (MLA), a first density map and a second density map, the first density map having been generated from the first image and the second density map having been generated from the second image | — 906 |

↓

| Output, by the MLA, an anomaly map | — 908 |

FIG. 9

SYSTEMS AND METHODS FOR COMPLIANCE MONITORING

CROSS-REFERENCE TO RELATED APPLICATION

The present Application claims priority to U.S. Provisional Patent Application No. 62/968,918 filed on Jan. 31, 2020, the entire disclosure of which is incorporated herein by reference.

FIELD

The present technology relates to machine-vision systems and methods for compliance monitoring in images. In particular, the present technology relates to systems and methods for identifying, locating and/or classifying multiclass incompliant items or features in images.

BACKGROUND

Developments in machine-vision techniques have enabled a certain level of automation in the identification of deviations and/or differences between images. One such machine-vision technique relies on a comparison of raw pixels from a first image defining a first state, also referred to as a "reference state", with raw pixels from a second image defining a second state, different from the first state.

An example of application of compliance monitoring relates to automatically analyzing images of products displayed in retail stores in an attempt to augment or replace manual compliance monitoring of product placement. Compliance monitoring of product placement may entail identifying whether a disparity exists between a desired product placement (equally referred to as a "planogram") and an actual product placement. Identification of such disparities typically triggers actions which may involve repositioning of products on shelves, replenishing of empty shelves and/or further actions on the supply chain of the retailer so as to ensure continuous availabilities of products, accurate tracking of products and/or a flawless experience for customers.

Existing approaches to compliance monitoring still present limitations, in particular, but not limited to, when applied to monitoring of product placement. Improvements are therefore desirable.

SUMMARY

The present technology is directed to systems and methods that facilitate, in accordance with at least one broad aspect, improved compliance monitoring from images. In accordance with at least another broad aspect, the present technology is directed to systems and methods that monitor product placements.

In one broad aspect, there is provided a method of monitoring product placement, the method comprising:
accessing a first image, the first image depicting a plurality of items arranged in accordance with a first layout, the plurality of items being categorised in accordance with a plurality of item classes, the first layout defining a reference state of placement of the items;
accessing a second image, the second image depicting at least some of the plurality of items arranged in accordance with a second layout, the second layout defining a different state of placement of the items;
inputting, to a machine learning algorithm (MLA), a first density map and a second density map, the first density map having been generated from the first image and the second density map having been generated from the second image; and outputting, by the MLA, an anomaly map, the anomaly map comprising a first indication of an item class associated with an anomaly and a second indication of a position associated with the anomaly.

In another broad aspect, there is provided a method of multiclass features compliance monitoring, the method comprising:
accessing a first image, the first image depicting a plurality of features arranged in accordance with a first layout, the plurality of features being categorised in accordance with a plurality of feature class;
accessing a second image, the second image depicting at least some of the plurality of features arranged in accordance with a second layout;
generating, a first density map from the first image, the first density map comprising a first plurality of density map layers, each one of the first plurality of density map layers being associated with a first set of distinct feature classes;
generating, a second density map from the second image, the second density map comprising a second plurality of density map layers, each one of the second plurality of density map layers being associated with a second set of distinct feature classes, the first and second set of distinct feature classes having at least some feature classes in common;
inputting, to an MLA, the first density map and the second density map, the MLA having been trained for generating one or more anomaly maps from density maps; and
outputting, by the MLA, an anomaly map generated by interleaving at least some of the density map layers of the first density map with density map layers of the second density map based on feature classes in common, the anomaly map comprising a first indication of a feature class associated with an anomaly and a second indication of a position associated with the anomaly.

In yet another broad aspect, there is provided a system for multiclass features compliance monitoring, the system comprising:
at least one processor, and
memory storing a plurality of executable instructions which, when executed by the at least one processor, cause the system to:
access a first image, the first image depicting a plurality of features arranged in accordance with a first layout, the plurality of features being categorised in accordance with a plurality of feature classes;
access a second image, the second image depicting at least some of the plurality of features arranged in accordance with a second layout;
generate, a first density map from the first image, the first density map comprising a first plurality of density map layers, each one of the first plurality of density map layers being associated with a first set of distinct feature classes;
generate, a second density map from the second image, the second density map comprising a second plurality of density map layers, each one of the second plurality of density map layers being associated with a second set of distinct feature classes, the first and second set of distinct feature classes having at least some feature classes in common;
input, to an MLA, the first density map and the second density map, the MLA having been trained for generating one or more anomaly maps from density maps; and
output, by the MLA, an anomaly map generated by interleaving at least some of the density map layers of the first density map with density map layers of the second density map based on feature classes in common, the anomaly map comprising a first indication of a feature class associated with an anomaly and a second indication of a position associated with the anomaly.

In other aspects, various implementations of the present technology provide a non-transitory computer-readable medium storing program instructions for executing one or more methods described herein, the program instructions being executable by a processor of a computer-based system.

In other aspects, various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device", a "computing device", an "operation system", a "system", a "computer-based system", a "computer system", a "network system", a "network device", a "controller unit", a "monitoring device", a "control device", a "server", and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 illustrates examples of Gaussian representations from images of products in accordance with at least one embodiment of the present technology;

FIG. 9 is a flow diagram illustrating steps of a computer-implemented method of monitoring product placement compliance in accordance with at least one embodiment of the present technology.

Figure 1:
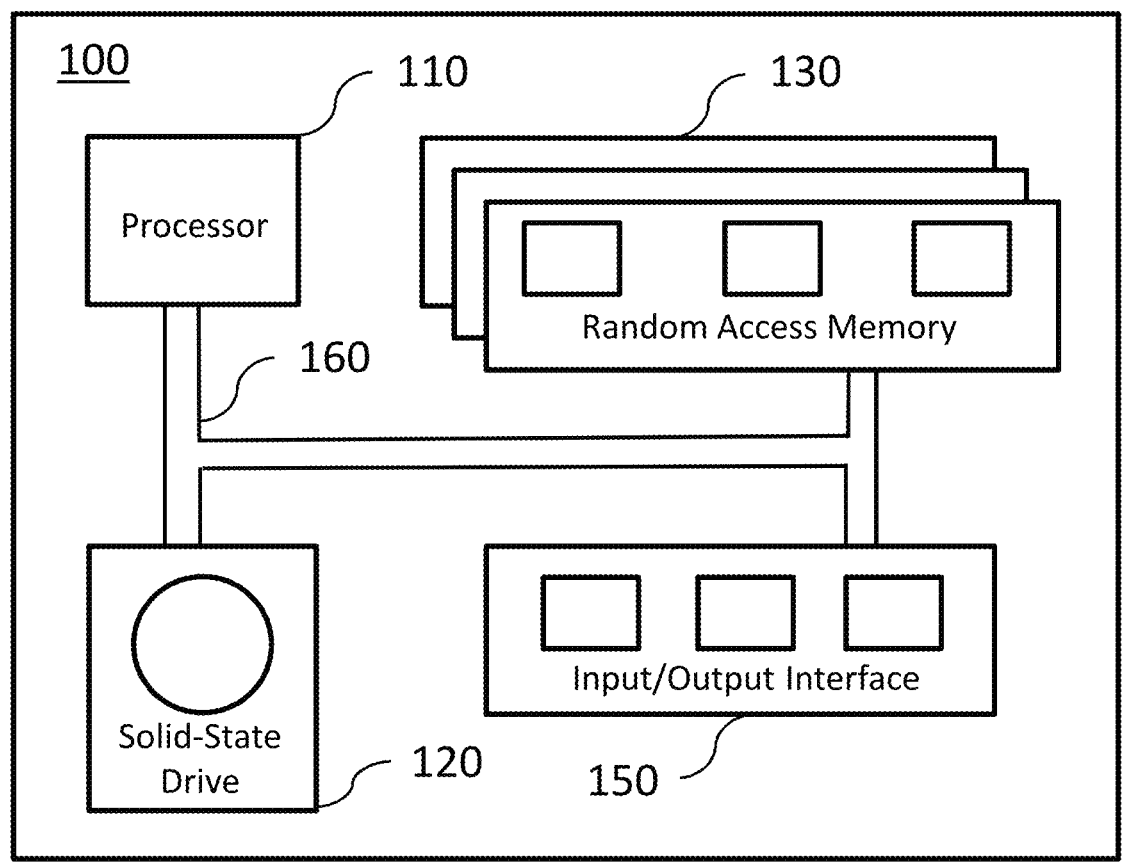
FIG. 1 is a block diagram of an example computing environment in accordance with at least one embodiment of the present technology.

Unless otherwise explicitly specified herein, the drawings ("Figures") are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof which provides the required capabilities.

With these fundamentals in place, we will now consider some non-limiting examples to illustrate various implementations of aspects of the present technology.

FIG. 1 illustrates a computing environment in accordance with an embodiment of the present technology, shown generally as 100. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to detect anomalies in images. In some alternative embodiments, the computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein, relating to compliance monitoring. For example, at least some of the program instructions may be part of a library or an application.

While the present technology is described in the context of monitoring compliance of product placement, this field of application should not be construed as being limitative. The present technology may be broadly defined as allowing identification, location and/or classification of multiclass incompliant items or features compared to a state of reference, whether such items or features relate to products or not. In some embodiments, multiclass incompliant items or features may be defined as items or features from one or more classes not being compliant with a state of reference associated with such items or features. Disparities of the items or features, compared to the reference state, may be identified, located and/or classified by the present technology. As a result, the present technology may be applicable to various contexts in which compliance is monitored based on a known reference state, e.g., a reference image. Non-limiting examples of alternative fields of application may include security applications monitoring items. Such security applications may rely on images of a reference state to determine if later acquired images (e.g., a video stream of a security camera) are compliant or not thereby automatically determining if an item has been stolen or if individuals are present at a location where they are not supposed to have access to.

Figure 2:
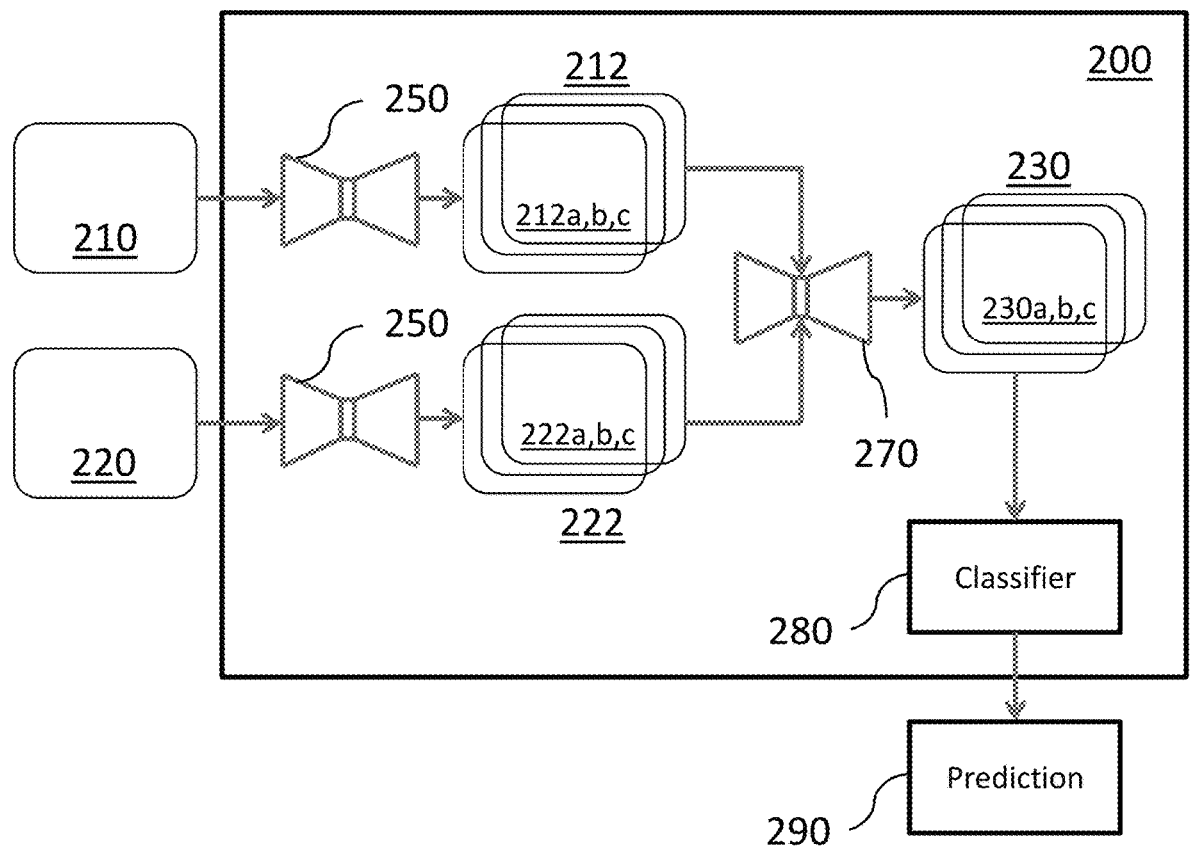
FIG. 2 is a block diagram illustrating a system configured for compliance monitoring in accordance with at least one embodiment of the present technology.

FIG. 2 is a block diagram illustrating a system 200 comprising a density generator module 250, an anomaly map generator module 270 and a classifier module 280. In accordance with some embodiments, the system 200 may receive a first image 210 and a second image 220 for further processing, for example, but without being limitative, further processing involving compliance monitoring.

The first image 210 and the second image 220 may be accessed from a computer-readable memory storing digital representations of images. The digital representations of the images may be stored in a computer-readable format, for example, but without being limitative, under the file formats jpeg, png, tiff and/or gif. The digital representations may be compressed or uncompressed. The digital representations may be in raster formats or vectorial formats. This aspect is non-limitative and multiple variations will become apparent to the person skilled in the art of the present technology. The first image 210 and the second image may have been generated synthetically and/or may have been generated by a camera, a scanner or any electronic device configured to generate a digital representation of an image.

Figure 7:
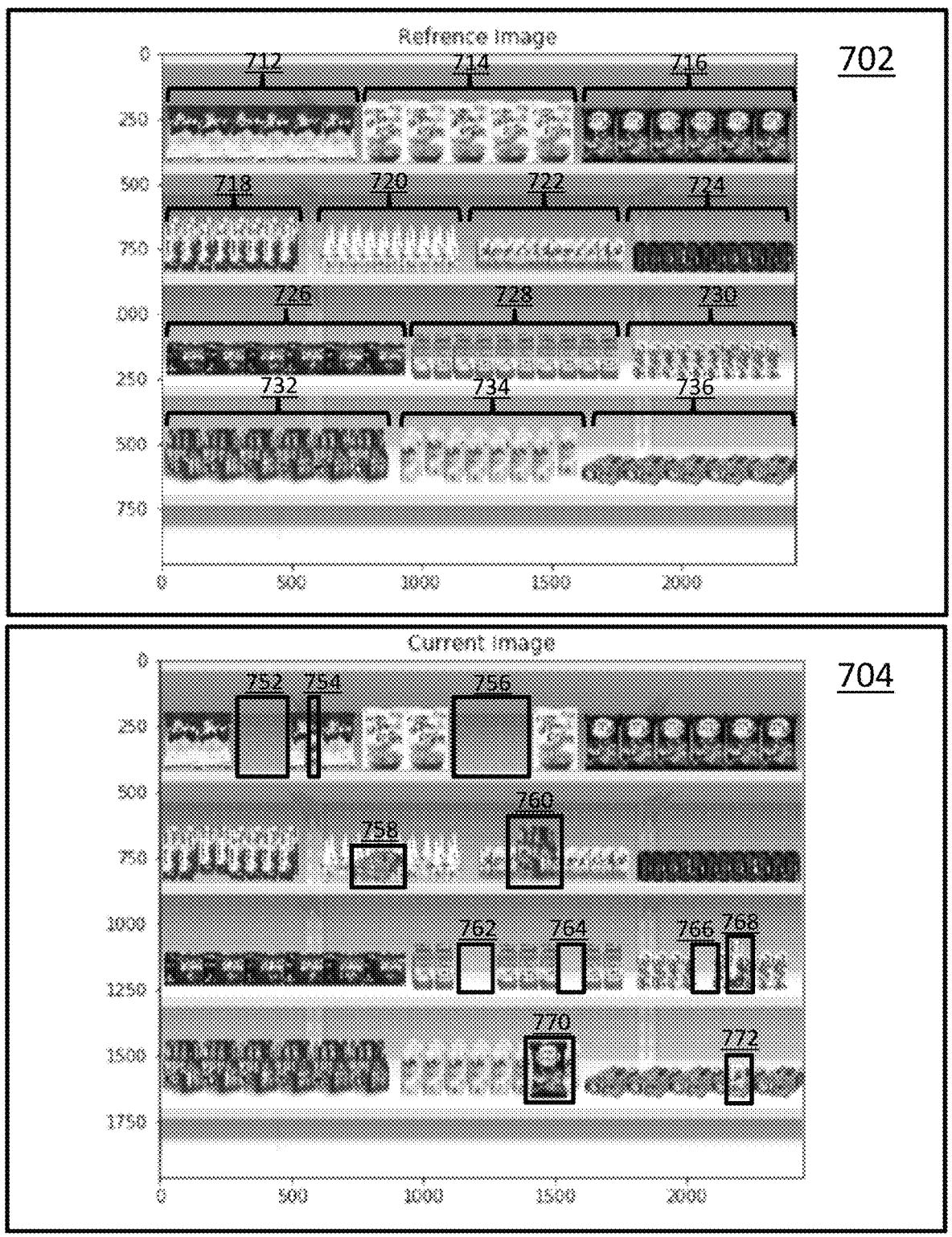
FIGS. 7 and 8 illustrate examples of anomaly maps and anomaly predictions generated from a first image and a second image in accordance with at least one embodiment of the present technology.

In some embodiments, the first image 210 depicts a plurality of items disposed in accordance with a first layout while the second image 220 depicts the plurality of items disposed in accordance with a second layout. The first layout may define a reference state of placement of the items. The second layout may define a different (e.g., modified) state of the placement of the items. A non-limitative example of a first image 210, referred to as reference image 702 (equally referred to as "gold reference image") is illustrated at FIG. 7. A non-limitative example of a second image 220, referred to as current image 704 is also illustrated at FIG. 7. The reference image 702 is referred to as a planogram. A planogram may broadly be described as a visual representation of a store's products or services on display. In some embodiments, the planogram may also be defined as a diagram that indicates placement of items (e.g., products) on shelves.

As it can be seen on FIG. 7, the reference image 702 comprises clusters of items 712-736. In this example, the items are products which are grouped by item classes (also referred to as "product classes" or "product types" or "product categories") and located at various locations of a plurality of shelves. As an example, a first item class associated with products 712 is "chip from brand X", a second item class associated with products 732 is "beer from brand Y", etc. In some embodiments, the reference image 702 is defined as a "reference image" as it defines a particular state used as a "benchmark" to detect anomalies. The reference image 702 may also be associated with specific localization information (e.g., spatial coordinates, one or more identifiers of a section of a store, an identifier of an aisle, of a bay, of a shelf, etc). In the example of anomaly detection for product placement, an anomaly may broadly be defined as a deviation from the reference image. In some embodiments, anomaly detection for product placement may equally be referred to as "monitoring product placement compliance". In some embodiments, an anomaly may be defined as an item or a feature which is not compliant with respect to a reference state. In some embodiments, the anomaly may be associated with an item class of the anomaly (e.g., the anomaly is associated with "beer from brand Y"), a position of the anomaly (e.g., coordinates locating the anomaly on the image, an identifier of a shelf or a location of a shelf, etc) and/or an anomaly type of the anomaly. Examples of anomaly type may, for example, include "high stock", "low stock", "out of stock" or "mismatch".

Still referring to FIG. 7, the current image 704 illustrates the same shelves as reference image 702 but with a different state of products placement. In this example, differences between a first state illustrated in the reference image 702 and a second state illustrated in the current image 704 comprises "mismatch" (i.e., product located in a different section of the shelves than the section in which they are represented in the reference image 702). Anomalies 754, 758, 760, 768, 770 and 772 are associated with the anomaly type "mismatch" as they are each associated with products located in a wrong product category (i.e., as defined in the reference image 702). Still in this example, differences between a first state illustrated in the reference image 702 and a second state illustrated in the current image 704 comprises "low stock" (i.e., product categories for which at least some products are missing to define a "full stock" state as represented in the reference image 702). Anomalies 752, 756, 762, 764 and 766 are associated with the anomaly type "low stock" as they are each associated with products missing from a location at which they were present in the reference image 702.

Referring back to FIG. 2, the first image 210 and the second image 220 are inputted to the density generator module 250. The density generator module 250 may be a single module processing the first image 210 and the second image 220 in series or in parallel. In some other embodiments, the first image 210 is processed by a first density generator module and the second image 220 is processed by a second density generator module. As illustrated at FIG. 2, the density generator module 250 outputs a first density map 212 which may comprise one or more layers 212a, 212b and 212c. The density generator module 250 also outputs a second density map 222 which may comprise one or more layers 222a, 222b and 222c. The first density map 212 and the second density map 222 are inputted to the anomaly map generator module 270 which in turn outputs an anomaly map 230 which may comprise one or more layers 230a, 230b and 230c. In some embodiments, the anomaly map 230 is inputted to the classifier module 280 so as to generate one or more predictions 290.

Figure 3:
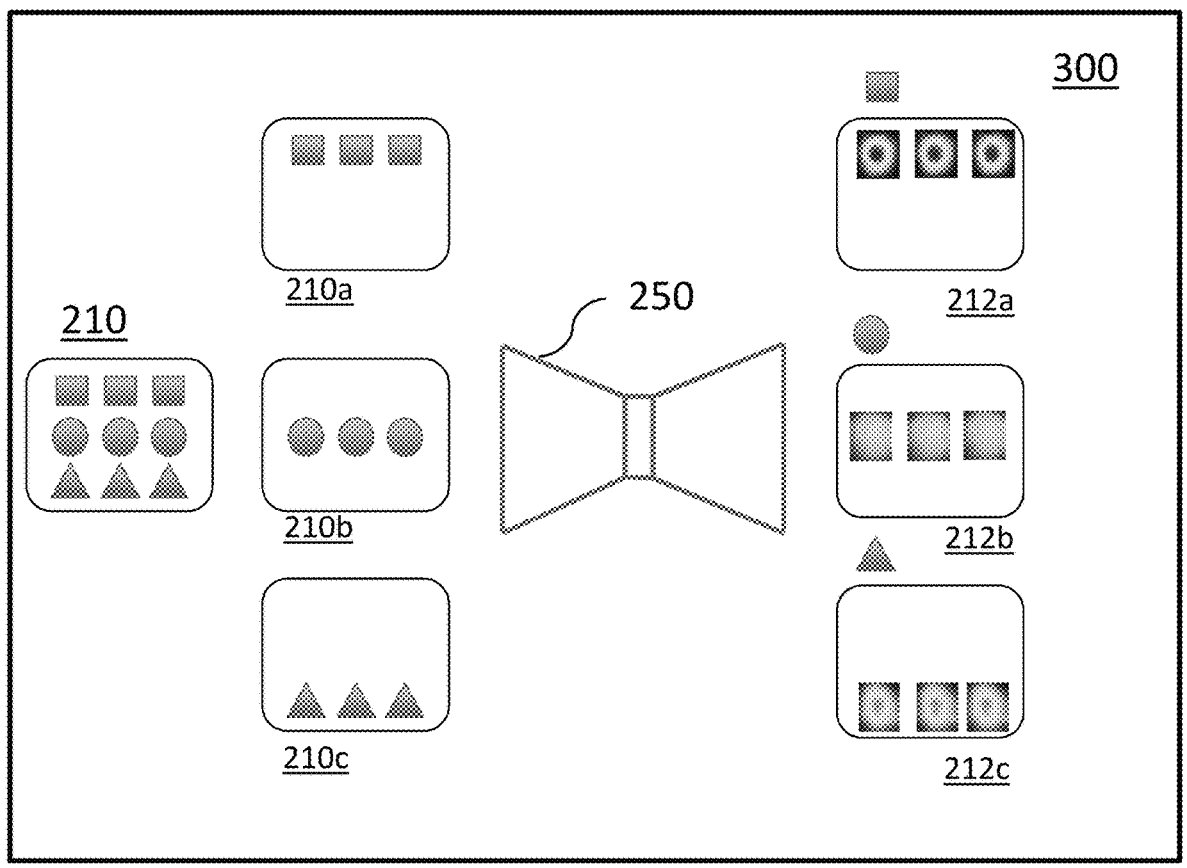
FIG. 3 is a diagram illustrating the generation of a first set of density maps in accordance with at least one embodiment of the present technology.

Referring now to FIG. 3, a sub-system 300 of the system 200 illustrates the density generator module 250 while processing the first image 210. In this example, the first image 210 is divided into three layers 210a, 210b and 210c. Each of the layers 210a-210c only comprises items of a given item class (i.e., square class for the layer 210a, round class for the layer 210b, triangle class for the layer 210c). As a result, the density generator module 250 do not process all item class at once but instead process each item class (i.e., a corresponding layer associated with the given item class) separately. In alternative embodiments, all item class are processed at once and, as a result, the step of dividing the first image 210 into multiple layers 210a-210c may not be required.

In the illustrated example, the density generator module 250 operates a machine learning algorithm (MLA) having been trained for generating one more density maps from images. In some embodiments, the MLA is a neural network, such as, but without being limitative, a convolutional neural network (CNN). In some embodiments, the CNN is trained based on various images of products, products on shelves and/or planograms. In some embodiments, the CNN is a dilated CNN which may be similar to the CNN implemented in CSRNet (see reference "Y. Li, X. Zhang, and D. Chen. Csrnet: Dilated convolutional neural networks for understanding the highly congested scenes. In Proceedings of the IEEE conference on computer vision and pattern recognition, pages 1091-1100, 2018", incorporated herein by reference). Such a CNN may learn a representation of an input image that may be useful for generating probability density distributions of items in an image. A network of the CNN may be trained end-to-end in a supervised manner by exploiting ground-truth densities that may be generated in preprocessing using point-level annotations.

In some embodiments, the MLA is configured to generate one or more density maps (equally referred to as "heat map") from an image. In some embodiments, the density map represents a probability of existence of an item. In some embodiments, the one or more density maps allow recognition of items as distinct items will be associated with distinct Gaussian representations. In some embodiments, the MLA applies a convolution with a Gaussian kernel to generate the density maps. In some embodiments wherein the MLA is a CNN, the CNN is trained to map an image to a density map in such a way that the CNN is said to recognize items from the image. Non-limitative examples of CNN architectures such as U-Net (see reference "Ronneberger, Olaf, Philipp Fischer, and Thomas Brox. "U-net: Convolutional networks for biomedical image segmentation." In International Conference on Medical image computing and computer-assisted intervention, pp. 234-241. Springer, Cham, 2015", hereby incorporated by reference) or Fully Convolutional Regression Network (FCRN, see "Weidi, Xie, J. Alison Noble, and Andrew Zisserman. "Microscopy cell counting with fully convolutional regression networks." In 1st Deep Learning Workshop, Medical Image Computing and Computer-Assisted Intervention (MICCAI). 2015", hereby incorporated by reference).

In some embodiments, the one or more density maps outputted by the MLA comprise Gaussian representations reflective of a probability of existence of an item, each one of the Gaussian representations comprising a center and a standard deviation, the center being representative of a center of the item and the standard deviation being representative of a size of the item. Examples of Gaussian representations are illustrated at FIG. 4. A first item 410 (i.e., a bag of chips) inputted to the MLA led to the generation of a first Gaussian representation 412, a second item 420 (i.e., a pack of beer bottles) inputted to the MLA led to the generation of a second Gaussian representation 422 and a third item 430 (i.e., a box of cereals) inputted to the MLA led to the generation of a third Gaussian representation 424.

Referring back to FIG. 3, the MLA operated by the density generator module 250 takes as inputs layers 210a-210c and outputs density map layers 212a-212c. In some embodiments, a density map may make reference to a single density map layer (i.e., a density map including a single item class) or to multiple density map layers (i.e., a density map including multiple item classes). In the embodiment of FIG. 3, each one of the density map layer 212a-212-c is associated with a distinct item class (i.e., the density map layer 212a is associated with the item class "square", the density map layer 212b is associated with the item class "circle" and the density map layer 212c is associated with the item class "triangle").

Figure 5:
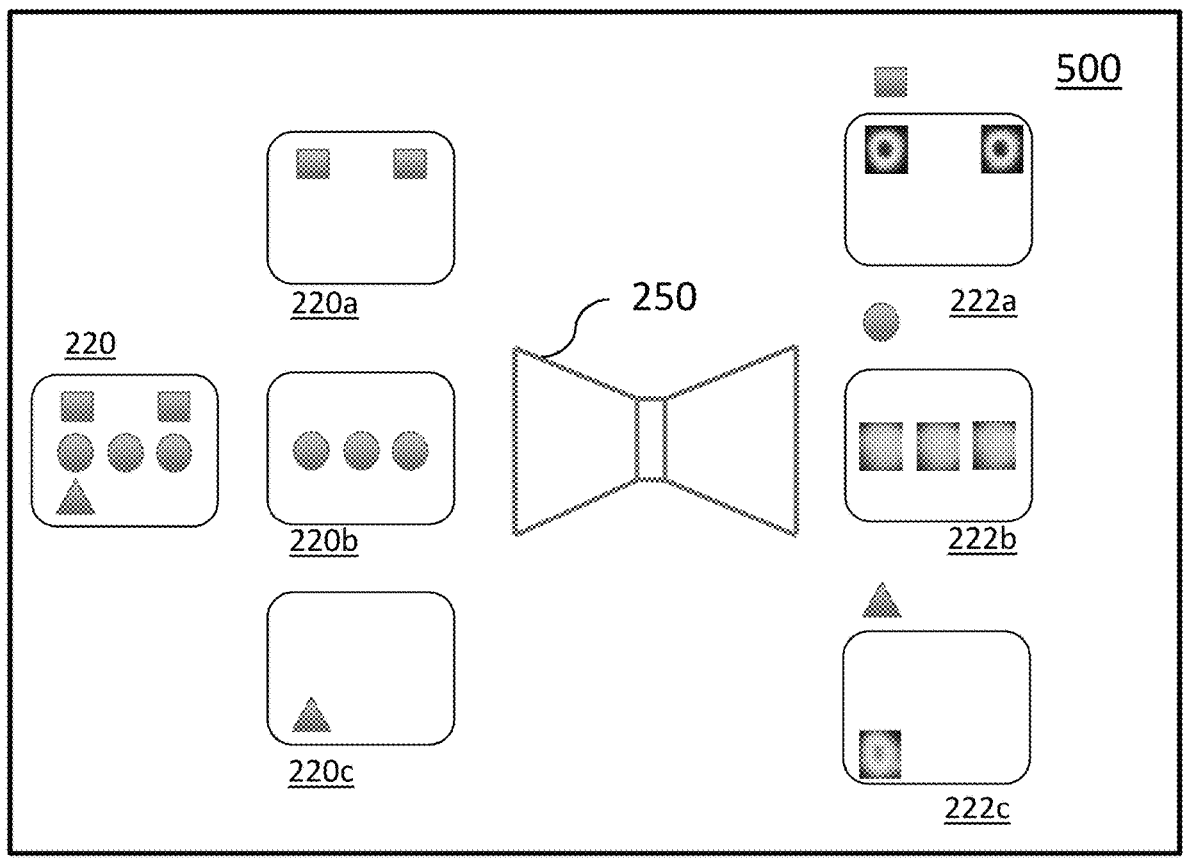
FIG. 5 is a diagram illustrating the generation of a second set of density maps in accordance with at least one embodiment of the present technology.

Turning now to FIG. 5, a sub-system 500 of the system 200 illustrates the density generator module 250 while processing the second image 220. In this example, the second image 220 is divided into three layers 220a, 220b and 220c. Each of the layers 220a-220c only comprises items of a given item class (i.e., square class for the layer 220a, round class for the layer 220b, triangle class for the layer 220c). As previously detailed in connection with the processing of the first image 210, the density generator module 250 does not process all item class at once but instead process each item class (i.e., a corresponding layer associated with the given item class) separately. In alternative embodiments, all item class are processed at once and, as a result, the step of dividing the second image 220 into multiple layers 220a-220c may not be required. In the example illustrated at FIG. 5, the second image 220 represents a second layout of the items represented in the first image 210, in particular, an item "square" and two items "triangle" are missing compared to the second image 210.

As illustrated at FIG. 5, the MLA operated by the density generator module 250 takes as inputs layers 220a-220c and outputs density map layers 222a-222c. As previously explained, in some embodiments, a density map may make reference to a single density map layer (i.e., a density map including a single item class) or to multiple density map layers (i.e., a density map including multiple item classes). In the embodiment of FIG. 5, each one of the density map layers 222a-222c is associated with a distinct item class (i.e., the density map layer 222a is associated with the item class "square", the density map layer 222b is associated with the item class "circle" and the density map layer 222c is associated with the item class "triangle"). As illustrated, the density map layers 222a-222c reflects the missing items of the second image 220.

Figure 6:
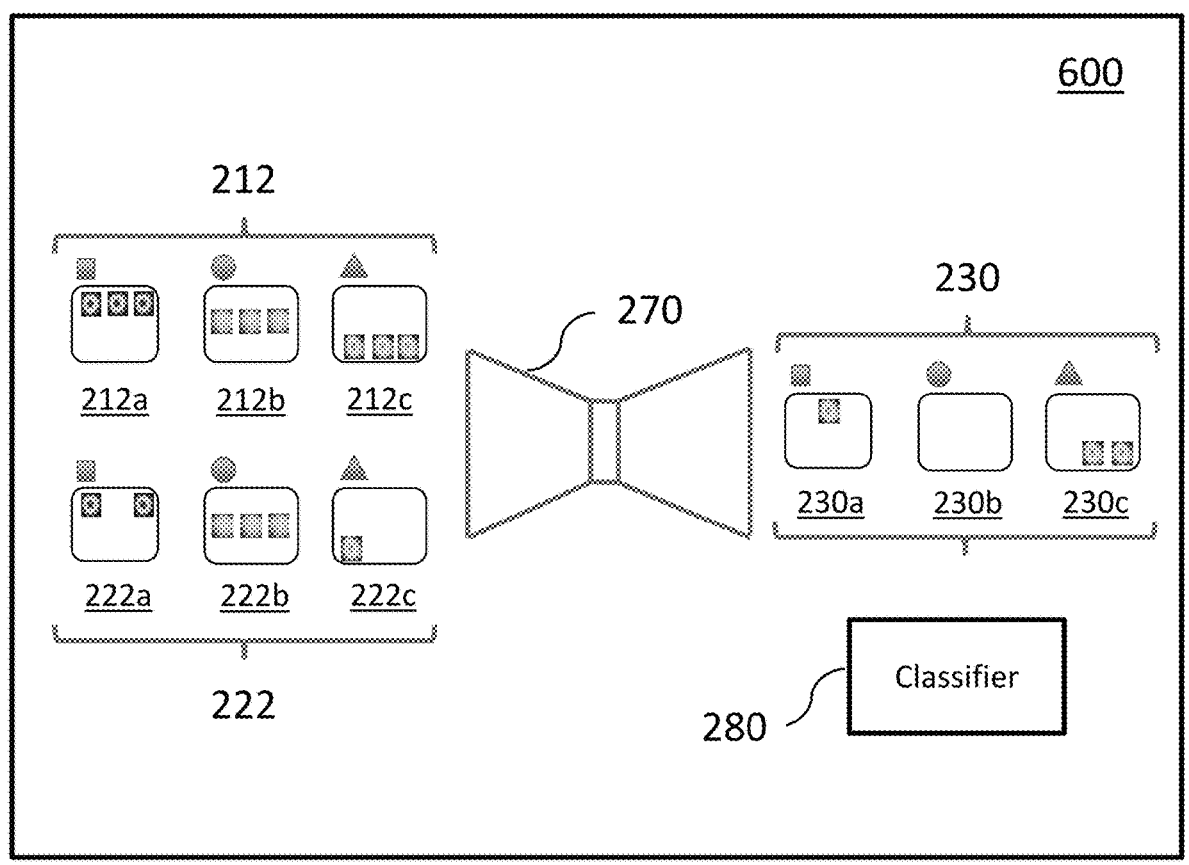
FIG. 6 is a diagram illustrating the generation of a set of anomaly maps in accordance with at least one embodiment of the present technology.

Turning now to FIG. 6, a sub-system 600 of the system 200 illustrates an anomaly map generator module 270 while processing the density map 212 and the density map 222 to output the anomaly map 230. In this example, each layer of the density map 212 is interleaved with its corresponding layer of the density map 222. In other words, the layer 212a is interleaved with the layer 222a, the layer 212b is interleaved with the layer 222b and the layer 212c is interleaved with the layer 222c. The interleaved layers are then inputted to the anomaly generator module 270. In some embodiments, the interleaved layers are processed in series (212a and 222a are first processed, then 212b and 222b and so on) while in other embodiments they are processed in parallel. In some embodiments, the anomaly map 230 outputted by the anomaly map generator module 270 comprises multiple layers, for example, a layer 230a, a layer 230b and a layer 230c. In some embodiments, each layer is associated with a distinct item class (i.e., square class for the layer 230a, round class for the layer 230b, triangle class for the layer 230c). As a result, the anomaly map generator module 270 does not process all item class at once but instead process each item class (i.e., a corresponding layer associated with the given item class) separately. In alternative embodiments, all item class are processed at once.

In the illustrated example, the anomaly map generator module 270 operates a machine learning algorithm (MLA) having been trained for generating one more anomaly maps from density maps. The anomaly map generator module 270 may also be referred to as an anomaly detection module and may not be limited to generating anomaly maps. To the contrary, in some embodiments, the anomaly map generator module 270 may generate indications of anomalies in other forms than an anomaly map. In some embodiments, the anomaly map generator module 270 implements an anomaly detection model. In some embodiments, the MLA is a neural network, such as, but without being limitative, a convolutional neural network (CNN). In some embodiments, the CNN is a delayed CNN. Non-limitative examples of CNN include fully convolutional network (FCN) based on architecture such as U-Net or FCRN.

In some embodiments, the network of the CNN takes density maps generated by a density generator (i.e., base model) as inputs and outputs anomaly maps. Amongst other benefits, generating anomaly densities from density maps of items instead of from raw images allows training a base model with any dataset that contains those items. Synthetic data may be used and specific data, such as retailer data, may not be required for the training. In some embodiments, the CNN implementing the anomaly detection model may be trained on the density maps generated by the density generator. In some embodiments, the training relies on a loss function that establishes a norm of a difference between generated density maps and generated anomaly maps with corresponding ground truth maps. The ground truth maps may be generated from point-level annotations of images contained in labels of the training dataset. In some embodiments, the labels comprise a sequence of points in which each point contains coordinates of an item of an associated image and an associated class of the item. Those points may be converted to a set of ground truth maps wherein each ground truth map is associated with a corresponding class and a gaussian mask around all the points that correspond to that item in the image.

Once the density generator and the anomaly detection model are trained, testing may occur. The testing may, in some embodiments, include inputting images to the density generator which outputs density maps that are in turn inputted to the anomaly detection model which outputs anomaly maps. As a result, the anomaly detection model may not require to be trained on specific real-life data as it may only require density maps that are independent of an exact shape, orientation and/or permutation of items and/or lighting or shadows of an environment in which a picture was taken.

In some embodiments, the CNN comprises a first group of layers configured so as to increase a number of channels and decrease a spatial size of density maps and a second group of layers configured so as to decrease a number of channels and increase a spatial size of the density maps. In some embodiments, the CNN is trained based on multiple planograms, various images of products, products on shelves and/or products arrangement. In some embodiments, the training of the CNN does not require identification of bounding boxes and the training phase may therefore be qualified as "weakly supervised". In some embodiments, the training phase involves point-level-annotation (e.g., labelling images by putting one point on each item, not by defining a boundary box).

Figure 8:
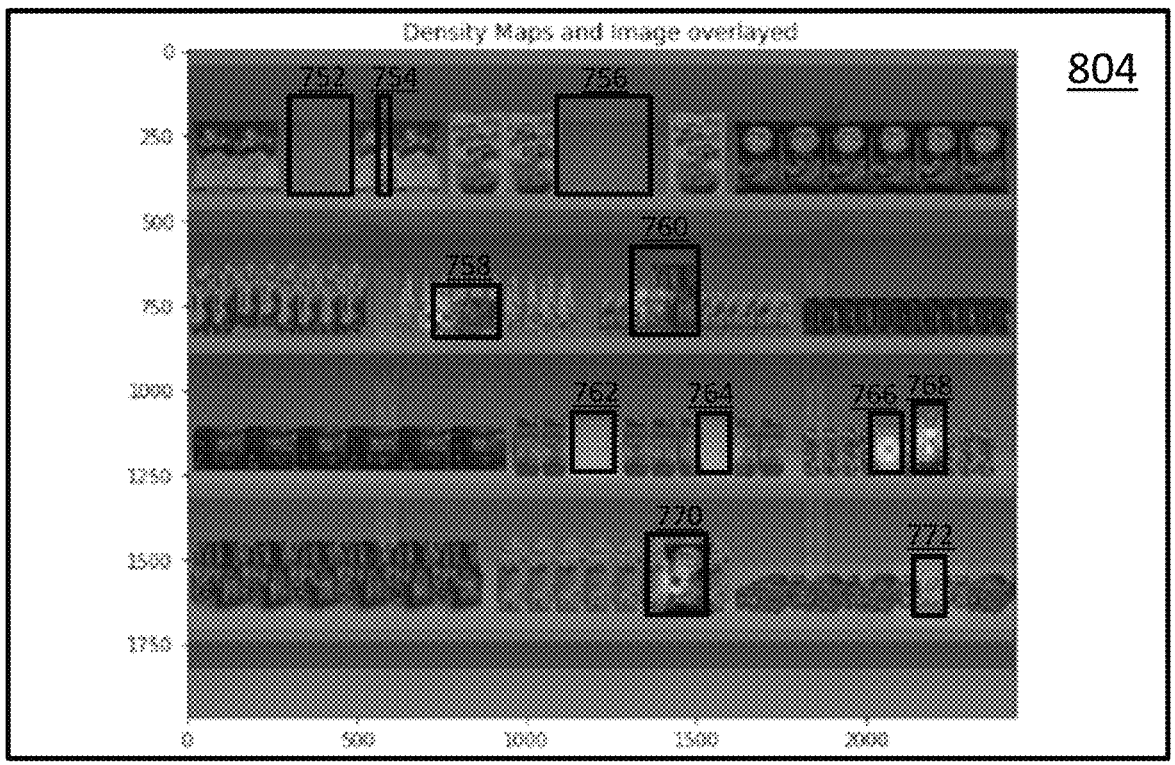

In some embodiments, the MLA is configured to generate an anomaly map from a first density map associated with a first state and a second density map associated with a second state. In some embodiments, the anomaly map allows identification of an item class associated with an anomaly and/or a position associated with the anomaly. In some embodiments, an anomaly map illustrates probability distribution of existence of anomalies. In some embodiments, the probability distribution is illustrated over the current image. In some embodiment, the anomaly map has the same size as the inputted image (e.g., the current image 220) and maps each pixel of the inputted image to a probability value between 0 and 1. Image pixels that correspond to higher values on the anomaly map are more likely to be located on an anomaly instance. As previously explained, in some embodiments, a distinct anomaly map (equally refer to as an anomaly map layer) is generated for each item class. As a result, if n item classes are present on the current image 220, then n anomaly maps will be outputted, each one corresponding to a distinct item class. FIG. 8 illustrates an example of an anomaly map 804 generated from the reference image 702 and the current image 704 on which probability distributions associated with multiple anomaly map layers (one per item class) are overlaid. The anomaly map 804 visually identifies anomalies 752, 754, 756, 758, 760, 762, 764, 766, 768, 770 and 772.

Now referring simultaneously to FIGS. 2 and 6, the anomaly map 230 outputted by the anomaly map generator module 270 is inputted to classifier module 280. The classifier module 280 is configured so as to predict anomaly types of anomalies identifiable from the anomaly map 230. In some embodiments, the classifier module 280 processes one layer of the anomaly map at a given time. In other words, the classifier module 280 outputs a prediction for a given item class by processing the layer associated with the given item class (i.e., the layer 230*a*, the layer 230*b* or the layer 230*c*). In some embodiments, the classifier module 280 operates a machine learning algorithm (MLA) having been trained for generating prediction of anomaly types from anomaly maps. In some embodiments, the MLA is a neural network, such as, but without being limited to, a CNN. In some embodiments, the MLA implements a classifier architecture including convolutional blocks followed by a few full-connected layers such as, for example, the ones implemented in the visual geometry group Net (VGG-Net). In some embodiments, the MLA is trained end-to-end with the anomaly detection module in a supervised framework. In some embodiments, the MLA maps each of the item classes to a category that represents status of the shelf for the given item class, such as, for example "high stock", "low stock", "out of stock", "low mismatch", "high mismatch", etc.

In some embodiments, the classifier module 280 outputs an anomaly type and an associated probability for each anomaly. As previously explained, the anomaly type, in the context of detecting anomalies of products placement, may include "high stock", "low stock", "out of stock", "low mismatch", "high mismatch", etc.

As it may be appreciated from the description above, the system 200 may take as an input a first image 210 and a second image 220 and outputs one or more anomalies and/or information associated with the anomalies. The information associated with the anomalies may comprise an item class associated with the anomaly, a position associated with the anomaly and/or an anomaly type associated with the anomaly. An example of information associated with anomalies 806 is illustrated at FIG. 8. Various format of outputs may be envisioned without departing from the scope of the present technology. As an example, a list of anomalies may take the form of a distinct raw for each anomaly, each raw comprising a first indication indicative of the item type of the anomaly, a second indication indicative of the location of the anomaly and/or a third indication indicative of a type of the anomaly. An example of an outputted raw associated with an anomaly may be as follows:

"Pack of beers"; [x_top, x_bottom, y_top, y_bottom]; status "out of stock"

In some embodiments, the MLAs operated by the density generator module 250, the anomaly map generator module 270 and the classifier module 280 are trained end-to-end so as to allow better calibration of each one of the modules 250, 270 and 280, and, as a result, improve an overall accuracy of the system 200.

Referring now to FIG. 9, some non-limiting example instances of systems and computer-implemented methods for monitoring product placement are detailed. More specifically, FIG. 9 shows a flowchart illustrating a computer-implemented method 900 implementing embodiments of the present technology. The computer-implemented method of FIG. 9 may comprise a computer-implemented method executable by a processor of a computing environment, such as the computing environment 100 of FIG. 1, the method comprising a series of steps to be carried out by the computing environment.

Certain aspects of FIG. 9 may have been previously described with references to FIG. 2-8. The reader is directed to that disclosure for additional details.

The method 900 starts at step 902 by accessing a first image, the first image depicting a plurality of items arranged in accordance with a first layout, the plurality of items being categorised in accordance with a plurality of item classes, the first layout defining a reference state of placement of the items. At step 904, the method 900 then proceeds to accessing a second image, the second image depicting at least some of the plurality of items arranged in accordance with a second layout, the second layout defining a different state of placement of the items.

The method 900, at step 906, proceeds to inputting, to a machine learning algorithm (MLA), a first density map and a second density map, the first density map having been generated from the first image and the second density map having been generated from the second image. At step 908, the method 900 proceeds to outputting, by the MLA, an anomaly map, the anomaly map comprising a first indication of an item class associated with an anomaly and a second indication of a position associated with the anomaly.

In some embodiments, the method 900 further comprises inputting, to a classifier, the anomaly map; and outputting, by the classifier, a third indication of an anomaly type associated with the anomaly. In some embodiments, the method 900 further comprises outputting the item class, the position and the anomaly type of the anomaly.

In some embodiments, the first image is a real image or a synthetic image. In some embodiments, the MLA is a first MLA and wherein the first density map has been generated by inputting the first image to a second MLA, the first density map comprising a first plurality of density map layers, each one of the first plurality of density map layers being associated with a distinct item class. In some embodiments, the second density map has been generated by inputting the second image to the second MLA, the second density map comprising a second plurality of density map layers, each one of the second plurality of density map layers being associated with a distinct item class.

In some embodiments, the first plurality of density map layers and the second plurality of density map layers are interleaved before being inputted to the first MLA. In some embodiments, the anomaly map comprises a third plurality of density map layers, each one of the third plurality of density map layers being associated with a distinct item class.

In some embodiments, the first density map and the second density map comprise Gaussian representations reflective of a probability of existence of an item, each one of the Gaussian representations comprising a center and a standard deviation, the center being representative of a center of the item and the standard deviation being representative of a size of the item. In some embodiments, the MLA comprises a convolutional neural network (CNN), the CNN comprising a first group of layers configured so as to increase a number of channels and decrease a spatial size of the first and second density maps and a second group of layers configured so as to decrease a number of channels and increase a spatial size of the first and second density maps.

Figure 10:
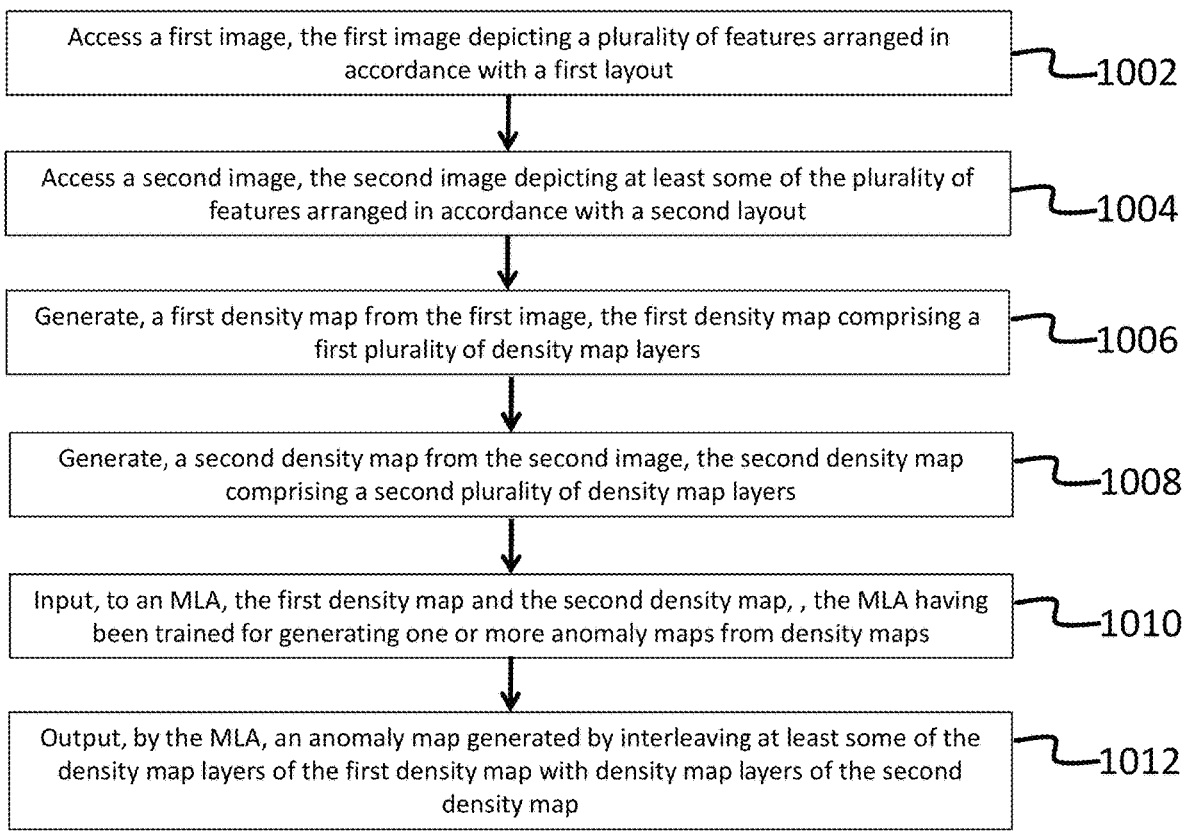
FIG. 10 is a flow diagram illustrating steps of a computer-implemented method of multiclass features compliance monitoring in accordance with at least one embodiment of the present technology.

Referring now to FIG. 10, some non-limiting example instances of systems and computer-implemented methods for anomaly detection are detailed. More specifically, FIG. 10 shows a flowchart illustrating a computer-implemented method 1000 implementing embodiments of the present technology. The computer-implemented method of FIG. 10 may comprise a computer-implemented method executable by a processor of a computing environment, such as the computing environment 100 of FIG. 1, the method comprising a series of steps to be carried out by the computing environment.

Certain aspects of FIG. 10 may have been previously described with references to FIG. 2-8. The reader is directed to that disclosure for additional details.

The method 1000 starts at step 1002 by accessing a first image, the first image depicting a plurality of features arranged in accordance with a first layout, the plurality of features being categorised in accordance with a plurality of feature class. Then, at step 1004, the method proceeds to accessing a second image, the second image depicting at least some of the plurality of features arranged in accordance with a second layout.

The method 1000, at step 1006, proceeds to generating, a first density map from the first image, the first density map comprising a first plurality of density map layers, each one of the first plurality of density map layers being associated with a first set of distinct feature classes. At step 1008, the method 1000 then proceeds to generating, a second density map from the second image, the second density map comprising a second plurality of density map layers, each one of the second plurality of density map layers being associated with a second set of distinct feature classes, the first and second set of distinct feature classes having at least some feature classes in common. At step 1010, the method 1000 then proceeds to inputting, to an MLA, the first density map and the second density map, the MLA having been trained for generating one or more anomaly maps from density maps. Then, at step 1012, the method 1000 proceeds to outputting, by the MLA, an anomaly map generated by interleaving at least some of the density map layers of the first density map with density map layers of the second density map based on feature classes in common, the anomaly map comprising a first indication of an feature class associated with an anomaly and a second indication of a position associated with the anomaly.

In some embodiments, the method 1000 further comprises inputting, to a classifier, the anomaly map; and outputting, by the classifier, a third indication of an anomaly type associated with the anomaly.

In some embodiments, the method 1000 further comprises outputting, the item class, the position and the anomaly type.

In some embodiments, the method 1000 may not be limited to compliance monitoring in the context of product placement. To the contrary, other fields of applications may also be envisioned without departing from the scope of the present technology. Such alternative embodiments may comprise monitoring of satellite images. In such an application, the method 1000 is executed on a first image and a second image wherein the first image is a first satellite image of a geographical area at a first given time and the second image is a second satellite image of the geographical area at a second given time.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A computer-implemented method of multiclass features compliance monitoring, the method comprising:
   accessing a first image, the first image depicting a plurality of features arranged in accordance with a first layout, the plurality of features being categorised in accordance with a plurality of feature classes;
   accessing a second image, the second image depicting at least some of the plurality of features arranged in accordance with a second layout;
   generating a first density map from the first image, the first density map comprising a first plurality of density map layers, each one of the first plurality of density map layers being associated with a first set of distinct feature classes;
   generating a second density map from the second image, the second density map comprising a second plurality of density map layers, each one of the second plurality of density map layers being associated with a second set of distinct feature classes, the first and second set of distinct feature classes having at least some feature classes in common;
   inputting, to an MLA, the first density map and the second density map, the MLA having been trained for generating one or more anomaly maps from density maps; and
   outputting, by the MLA, an anomaly map generated by interleaving at least some of the density map layers of the first density map with density map layers of the second density map based on feature classes in common, the anomaly map comprising a first indication of a feature class associated with an anomaly and a second indication of a position associated with the anomaly.

2. The method of claim 1, further comprising:
   inputting, to a classifier, the anomaly map; and
   outputting, by the classifier, a third indication of an anomaly type associated with the anomaly.

3. The method of claim 1, further comprising:
   outputting the item class, the position and the anomaly type.

4. The method of claim 1, wherein the MLA has been trained based on a loss function that establishes a norm of a difference between generated density maps and generated anomaly maps with corresponding ground truth maps.

5. The method of claim 1, wherein the plurality of features comprise a plurality of product items categorised in accordance with a plurality of product item classes.

6. The method of claim 1, wherein the first density map and the second density map comprise Gaussian representations reflective of a probability of existence of a feature, each one of the Gaussian representations comprising a center and a standard deviation, the center being representative of a center of the feature and the standard deviation being representative of a size of the feature.

7. The method of claim 1, wherein the MLA comprises a convolutional neural network (CNN), the CNN comprising a first group of layers configured so as to increase a number of channels and decrease a spatial size of the first and second density maps and a second group of layers configured so as to decrease a number of channels and increase a spatial size of the first and second density maps.

8. A computer-implemented method of monitoring product placement compliance, the method comprising:
   accessing a first image, the first image depicting a plurality of items arranged in accordance with a first layout, the plurality of items being categorised in accordance with a plurality of item classes, the first layout defining a reference state of placement of the items;
   accessing a second image, the second image depicting at least some of the plurality of items arranged in accordance with a second layout, the second layout defining a different state of placement of the items;
   inputting, to a first machine learning algorithm (MLA), a first density map and a second density map, the first density map having been generated from the first image and the second density map having been generated from the second image, the first MLA having been trained for generating one or more anomaly maps from density maps; and
   outputting, by the first MLA, an anomaly map, the anomaly map comprising a first indication of an item class associated with an anomaly and a second indication of a position associated with the anomaly;
   wherein the first density map has been generated by inputting the first image to a second MLA, the first density map comprising a first plurality of density map layers, each one of the first plurality of density map layers being associated with a distinct item class.

9. The method of claim 8, further comprising:
   inputting, to a classifier, the anomaly map; and
   outputting, by the classifier, a third indication of an anomaly type associated with the anomaly.

10. The method of claim 8, further comprising:
    outputting the item class, the position and the anomaly type of the anomaly.

11. The method of claim 8, wherein the second density map has been generated by inputting the second image to the second MLA, the second density map comprising a second plurality of density map layers, each one of the second plurality of density map layers being associated with a distinct item class.

12. The method of claim 11, wherein the first plurality of density map layers and the second plurality of density map layers are interleaved before being inputted to the first MLA.

13. The method of claim 11, wherein the anomaly map comprises a third plurality of density map layers, each one of the third plurality of density map layers being associated with a distinct item class.

14. The method of claim 8, wherein the first density map and the second density map comprise Gaussian representations reflective of a probability of existence of an item, each one of the Gaussian representations comprising a center and a standard deviation, the center being representative of a center of the item and the standard deviation being representative of a size of the item.

15. The method of claim 8, wherein the first MLA comprises a convolutional neural network (CNN), the CNN comprising a first group of layers configured so as to increase a number of channels and decrease a spatial size of the first and second density maps and a second group of layers configured so as to decrease a number of channels and increase a spatial size of the first and second density maps.

16. A system for multiclass features compliance monitoring, the system comprising:
   at least one processor, and
   memory storing a plurality of executable instructions which, when executed by the at least one processor, cause the system to:
   access a first image, the first image depicting a plurality of features arranged in accordance with a first layout, the plurality of features being categorised in accordance with a plurality of feature classes;
   access a second image, the second image depicting at least some of the plurality of features arranged in accordance with a second layout;
   generate a first density map from the first image, the first density map comprising a first plurality of density map layers, each one of the first plurality of density map layers being associated with a first set of distinct feature classes;
   generate a second density map from the second image, the second density map comprising a second plurality of density map layers, each one of the second plurality of density map layers being associated with a second set of distinct feature classes, the first and second set of distinct feature classes having at least some feature classes in common;
   input, to an MLA, the first density map and the second density map, the MLA having been trained for generating one or more anomaly maps from density maps; and
   output, by the MLA, an anomaly map generated by interleaving at least some of the density map layers of the first density map with density map layers of the second density map based on feature classes in common, the anomaly map comprising a first indication of a feature class associated with an anomaly and a second indication of a position associated with the anomaly.

17. The system of claim 16, wherein the plurality of features comprise a plurality of product items categorised in accordance with a plurality of product item classes.

18. The system of claim 16, wherein the first density map and the second density map comprise Gaussian representations reflective of a probability of existence of a feature, each one of the Gaussian representations comprising a center and a standard deviation, the center being representative of a center of the feature and the standard deviation being representative of a size of the feature.

19. The system of claim 16, wherein the MLA comprises a convolutional neural network (CNN), the CNN comprising a first group of layers configured so as to increase a number of channels and decrease a spatial size of the first and second density maps and a second group of layers configured so as to decrease a number of channels and increase a spatial size of the first and second density maps.

20. A system for monitoring product placement compliance,
   the system comprising:
   at least one processor, and
   memory storing a plurality of executable instructions which, when executed by the at least one processor, cause the system to:
   access a first image, the first image depicting a plurality of items arranged in accordance with a first layout, the plurality of items being categorised in accordance with a plurality of item classes, the first layout defining a reference state of placement of the items;
   access a second image, the second image depicting at least some of the plurality of items arranged in accordance with a second layout, the second layout defining a different state of placement of the items;
   input, to a first machine learning algorithm (MLA), a first density map and a second density map, the first density map having been generated from the first image and the second density map having been generated from the second image, the first MLA having been trained for generating one or more anomaly maps from density maps; and
   output, by the first MLA, an anomaly map, the anomaly map comprising a first indication of an item class associated with an anomaly and a second indication of a position associated with the anomaly;
   wherein the first density map has been generated by inputting the first image to a second MLA, the first density map comprising a first plurality of density map layers, each one of the first plurality of density map layers being associated with a distinct item class.

* * * * *